United States Patent [19]

Imajo et al.

[11] Patent Number: 4,706,193
[45] Date of Patent: Nov. 10, 1987

[54] OIL DEGRADATION WARNING SYSTEM

[75] Inventors: Minoru Imajo, Yokohama; Tsunehiro Kawakita, Yokosuka, both of Japan

[73] Assignee: Nissan Motor Company, Limited, Yokohama, Japan

[21] Appl. No.: 828,358

[22] Filed: Feb. 11, 1986

[30] Foreign Application Priority Data

Feb. 12, 1985 [JP] Japan .................................. 60-23549
Sep. 5, 1985 [JP] Japan ............................... 60-194866

[51] Int. Cl.$^4$ ....................... G06F 15/20; F01M 11/10
[52] U.S. Cl. ................................. 364/424; 123/196 S; 340/52 F
[58] Field of Search ............... 364/424, 550, 551, 571; 123/196 R, 196 S, 198 D; 73/290 R, 291; 340/52 R, 52 F

[56] References Cited

U.S. PATENT DOCUMENTS 4,306,525 12/1981 Faxvog ............................. 123/196 S
4,506,337 3/1985 Yasuhara ......................... 123/196 S
4,525,782 6/1985 Wohlfarth et al. ............... 340/52 R

FOREIGN PATENT DOCUMENTS 59-43299 3/1984 Japan .

Primary Examiner—Gary Chin
Attorney, Agent, or Firm—Schwartz, Jeffery, Schwaab, Mack, Blumenthal & Evans

[57] ABSTRACT

Disclosed herein is an oil degradation warning system of a motor vehicle, which can issue a warning at the time when the oil change is really needed. The system comprises first means for detecting respective values of degradation factors of oil, the degradation factors being closely related to the operation history of the motor vehicle, second means for adding the values by using a predetermined calculation formula and integrating the added result with passage of time, third means for issuing a warning signal when the integrated result exceeds a predetermined limit, and fourth means which, when oil replenishment is carried out, postpones the issue of the warning signal in accordance with the amount of the replenished oil.

14 Claims, 13 Drawing Figures

OIL DEGRADATION WARNING SYSTEM

BACKGROUND OF THE INVENTION

1. Field of the Invention

The present invention relates to a warning system of a motor vehicle, and particularly to a so-called 'oil degradation warning system' which issues a visual and/or audible warning when the oil (viz., engine oil, transmission oil or the like) has been degraded to a certain unusable level. More specifically, the present invention is concerned with the oil degradation warning system which is designed to postpone the issue of warning when replenishment of oil is carried out.

2. Description of the Prior Art

As is known, lubrication oil, such as engine oil, transmission oil or the like, tends to degrade gradually with passage of time for which the oil is practically used. Thus, it is necessary to change the oil when it is degraded to a certain unusable level.

In view of the above, several kinds of oil degradation warning systems have been hitherto proposed and put into practical use. One of them is the engine oil degradation warning system disclosed in Japanese Patent First Provisional Publication No. 59-43299, in which 'moved distance' and 'operation time' of the vehicle, 'oil temperature' and 'engine speed' are used as parameters for estimating the degradation degree of the engine oil. That is, these data are momentarily detected, the detected data are added and integrated with passage of time, and when the integrated result reaches to a predetermined limit, a warning for need of oil change is issued.

Apart from the above, it is also known that the amount of the engine oil is gradually reduced because of burning thereof during engine operation. Thus, oil replenishment is necessary under practical use of the vehicle. With the replenishment, the concentration of impurities in the oil is reduced thereby substantially lowering the oil degradation degree, that is, reviving the oil. However, since, in the afore-described warning system, the warning time (viz., the time at which the warning is issued) is determined by only considering the automatically detected informations or data (viz., moved distance, operation time, oil temperature and engine speed) on vehicle operation history, the oil replenishment permits the warning device to issue the warning considerably before the time when the oil change is really needed. That is, in an extreme case, it occurs that the oil change warning is issued on the day subsequent to the oil replenishment.

SUMMARY OF THE INVENTION

It is therefore an object of the present invention to provide an oil degradation warning system which can issue the warning at the time when the oil change is really needed.

It is another object of the present invention to provide an oil degradation warning system which can postpone the issue of warning when oil replenishment is carried out.

It is still another object of the present invention to provide an oil degradation warning system which can automatically detect oil replenishment and upon this, postpone the issue of warning in accordance with the amount of the replenished oil.

According to the present invention, there is provide an oil degradation warning system for a motor vehicle, which comprises first means for detecting respective values of degradation factors of oil, the degradation factors being closely related to the operation history of the motor vehicle, second means for adding the values by using a predetermined calculation formula and integrating the added values with passage of time; third means for issuing a warning signal when the integrated value exceeds a predetermined limit; and fourth means which, when oil replenishment is carried out, postpones the issue of the warning signal in accordance with the amount of the replenished oil.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
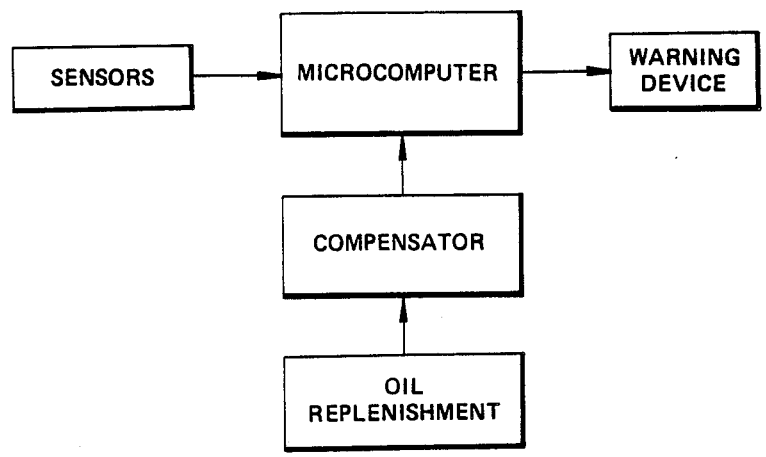
FIG. 1 is a basic diagram of an oil degradation warning system of a first embodiment of the present invention.

Referring to FIG. 1 of the drawings, there is shown a basic diagram of the oil degradation warning system of a first embodiment of the invention. As will become apparent as the description proceeds, the warning system has two principal operations. One is an operation wherein some parameters (viz., moved distance, operation time, oil temperature and engine speed, etc.,) are detected by various sensors, the values of the parameters are added by using a given formula in an operational circuit and integrated with passage of time, and when the integrated value exceeds a given limit, a warning signal is issued from the operational circuit thereby to cause a warning device to issue a visual and/or audible warning. The other is an operation wherein upon replenishment of oil, the amount of the replenished oil is inputted, as a parameter, into a compensation means thereby to cause the operational circuit to postpone the output of the warning signal therefrom by a degree corresponding to the amount of the replenished oil.

Figure 2:
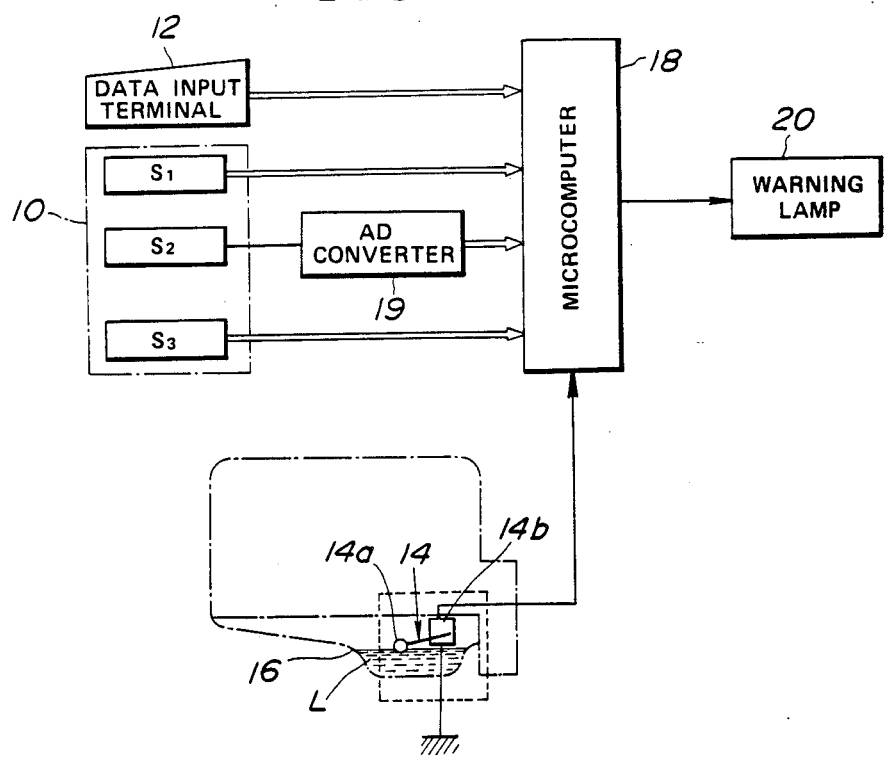
FIG. 2 is a block diagram of the oil degradation warning system of the first embodiment.

Referring to FIG. 2, there is shown a block diagram of the first embodiment. In the disclosed embodiment, 'moved distance' of the vehicle, 'engine oil temperature', 'engine speed' and the like are employed as parameters for determining the degradation degree of the engine oil.

In the drawing (FIG. 2), numeral 10 denotes a sensor group which includes an odometer $S_1$ for detecting the 'moved distance' of the vehicle, a temperature sensor $S_2$ for detecting the 'oil temperature', a crankangle sensor $S_3$ for detecting the 'engine speed'. Numeral 12 denotes a data input terminal (viz., keyboard) for putting data of nature of the oil (viz., grade, type, etc.,) into a microcomputer 18. Denoted by numeral 14 is a level sensor which is mounted in an oil pan 16 of the associated engine to detect the level of the engine oil L. In the disclosed embodiment, a float type sensor 14 is employed, which includes a float 14a and a variable resistor 14b. If desired, a condenser type sensor may be used as the level sensor 14. The microcomputer 18 receives the data from the sensors of the sensor group 10 and those from the data input terminal 12 and processes the data using a predetermined program and issues a warning signal upon a certain condition. An AD-converter 19 is arranged between the sensor group 10 and the microcomputer 18. Denoted by numeral 20 is a warning lamp which is energized to light when receiving the warning signal from the microcomputer 18.

Figure 3:
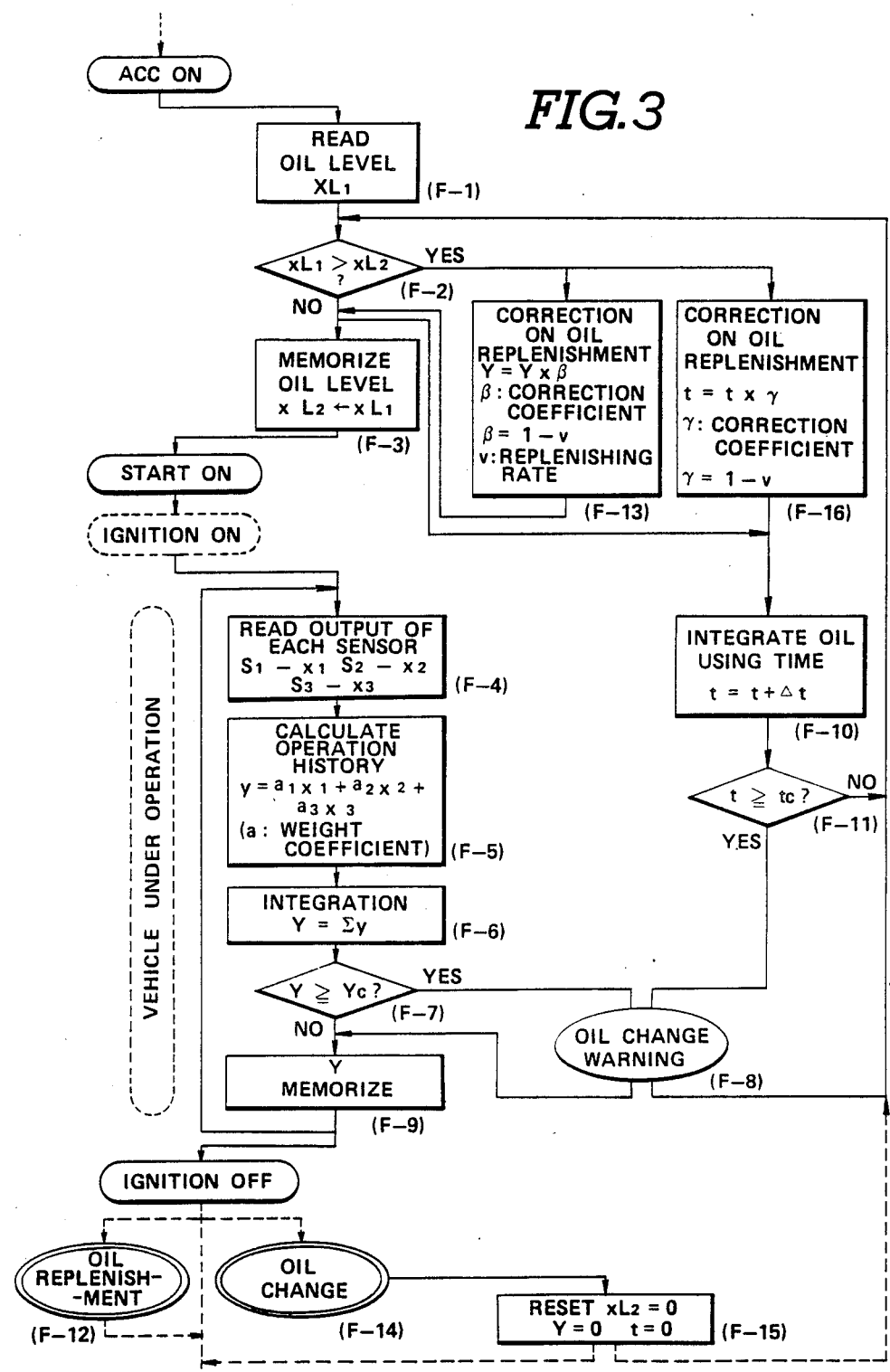
FIG. 3 is a flowchart for carrying out a program set in the oil degradation warning system of the first embodiment.

Referring to FIG. 3, there is shown a flowchart which shows a given program executed by the microcomputer 18. Thus, in the following, the operation of the warning system of the first embodiment will be described with reference to the flowchart of FIG. 3.

When a driver puts an ignition key into an ignition key cylinder and turns the same to 'ACC' (accessary) position, the program starts and the level sensor 14 detects the oil level $x_{L1}$ (STEP F-1). Then, a comparation is carried out as to whether the instant oil level $x_{L1}$ is higher than a previously memorized oil level $x_{L2}$ or not. If NO (STEP F-2, that is, if the current level $x_{L1}$ is equal to or lower than the previous level $x_{L2}$), the instant level $x_{L1}$ is newly memorized as a new reference level $x_{L2}$ judging that replenishment of oil has not been carried out (STEP F-3).

The driver turns the ignition key to 'START' position to start the engine and the vehicle. During operation of the vehicle, the outputs from the odometer $S_1$, the oil temperature sensor $S_2$, the crankangle sensor $S_3$ and the like are read as information data $x_1, x_2, x_3, \ldots x_n$, (STEP F-4) and these outputs $x_1$ to $x_n$ are multiplied respectively by predetermined weight coefficients $\alpha_1$, $\alpha_2, \alpha_3 \ldots \alpha_n$ and added to provide an added 'y' (STEP F-5). The value 'y' is integrated with passage of time to provide an integrated value 'Y' (That is, $Y = \Sigma y$, (STEP F-6). It is to be noted that the integrated value 'Y' represents a so-called 'operation history' of the associated vehicle. When the value 'Y' is equal to or greater than a limited value '$Y_c$' (STEP F-7) representative of the condition in at which the oil has been degraded to unusable degree, a warning signal is issued from the microcomputer 18 to energize the warning lamp 20 thereby letting the driver know the need of oil change (STEP F-8). While. when the value 'Y' is still smaller than the limited value '$Y_c$', such warning is not issued.

That is, in such case, repeating the calculation '$Y = \Sigma y$', a new integrated value 'Y' is memorized step by step (STEP F-9). Accordingly, when the ignition key is turned to 'OFF' position to stop the engine, a current oil level $x_{L2}$ and a currently memorized integrated value 'Y' are newly stored in RAM of the microcomputer 18.

It is known that the engine oil is degraded naturally with passage of time. Thus, when, at STEP F-2, a judgement is so made that oil replenishment has not been carried out, the period or time passed from the time when a previous oil change was made is integrated to provide an integrated time value 't' (STEP F-10). When the value 't' is equal to or greater than a limited value '$t_c$' (STEP F-11), a warning signal is issued from the microcomputer 18 to energize the warning lamp 20 thereby letting the driver know the need of oil change (STEP F-8).

On the contrary, when the oil replenishment is carried out during standstill of the engine (STEP F-12), the oil level $x_{L1}$ (which is read when the ignition key is turned to 'ACC' position) becomes greater than the previously memorized level $x_{L2}$ (STEP F-2). In this case, the integrated value 'Y' is multiplied by a correction coefficient $\beta$ ($=1-v$) which is determined in accordance with 'v' which represents the ratio of the amount of the added or poured oil to the entire amount of oil after the oil replenishment, that is, $(x_{L1} - x_{L2})/x_{L1}$. With this, correction of the operation history of the vehicle is carried out establishing '$Y = Y \times \beta$' (STEP F-13). Then, the previously memorized level $x_{L2}$ is replaced with a new oil level $x_{L1}$ and memorized (STEP F-3). Thereafter, the above-mentioned STEPS F-4 to F-9 are carried out.

When, on the contrary, substantially all oil is changed during the standstill of the engine (STEP F-14), the inevitably induced 'temporal oil absent condition' is detected by the oil level sensor 3. With this, interruption is carried out to effect 'reset' operation clearing the memorized data, making the integrated value 'Y' zero, the time value 't' zero and the memorized oil level $x_{L2}$ zero (STEP F-15). Thus, when the engine restarts, the values 'Y' and 't' are newly calculated.

When, at STEP F-2, replenishment of oil is detected, the afore-mentioned correction of the integrated value 'Y' is effected (STEP F-13) and at the same time, correction of the time value 't' is effected (STEP F-16). The correction coefficient '$\gamma$' for the time value 't' is the same as the afore-mentioned '$\beta$', that is, $\gamma = 1 - v$. It is to be noted that the value 'v' represents the ratio of the amount of the added oil to the entire amount of oil after the oil replenishment. The time value 't' thus corrected is integrated at STEP F-10 in the same manner as that mentioned hereinafore. Thereafter, the STEP F-11 and F-8 are carried out.

As will be understood from the above, in the disclosed first embodiment, when oil replenishment is carried out, the integrated value 'Y' representative of the operation history of the associated vehicle and the integrated time value 't' representative of the passed time from the oil change are corrected or compensated in a manner to be reduced in accordance with the ratio 'v' of the amount of the added (or poured) oil to the entire amount of the oil. Thus, the oil change warning time is correspondingly postponed. so that it is possible to issue the oil change warning at just the time when the oil change is really needed.

Figure 4:
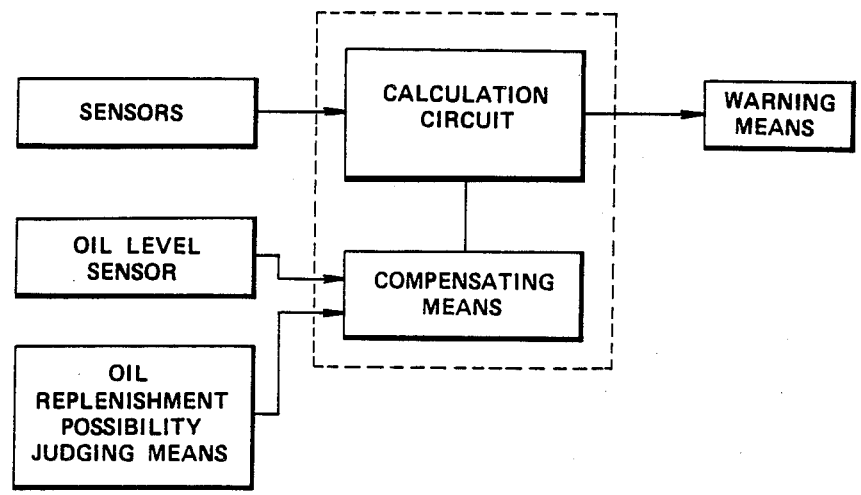
FIG. 4 is a basic diagram of an oil degradation warning system of a second embodiment of the present invention.

Referring to FIG. 4 of the drawings, there is shown a basic diagram of the oil degradation warning system of a second embodiment of the present invention. As will be apparent as the description proceeds, in the second embodiment, the oil change time is much more precisely detected and warned as compared with the aforedescribed first embodiment.

Figure 5:
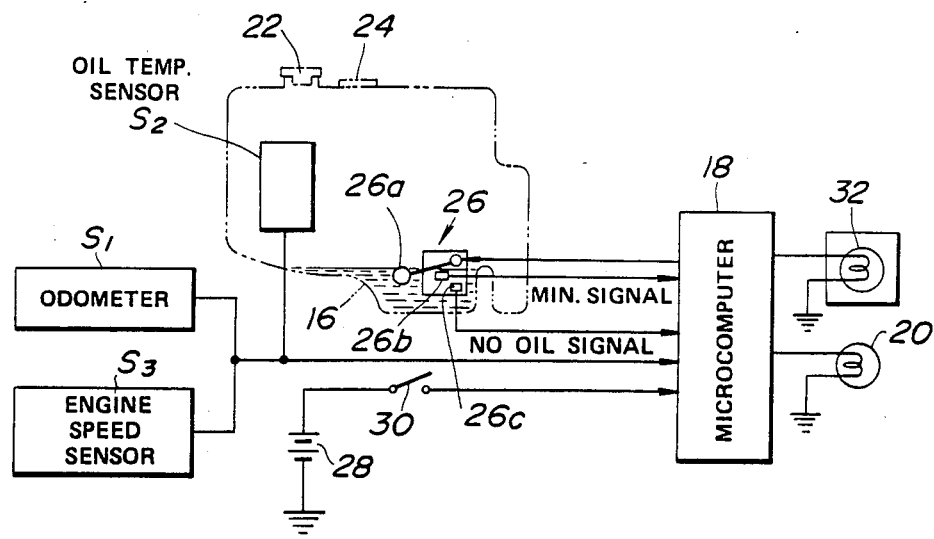
FIG. 5 is a block diagram of the oil degradation warning system of the second embodiment.

Referring to FIG. 5, there is shown a block diagram of the second embodiment. In the drawing, functionarily corresponding parts are denoted by the same numerals as those in FIG. 2 of the first embodiment. Thus, numeral 16 denotes an oil pan of the associated engine. References $S_1$, $S_2$ and $S_3$ denote the odometer, the oil temperature sensor and the engine speed sensor, respectively. Numeral 22 denotes a filler cap and numeral 24 denotes a caution plate on which required amount of replenished oil is described. Denoted by numeral 26 is an oil level sensor which comprises a float 26a, a first stationary contact 26b and a second stationary contact 26c. The first stationary contact 26b is arranged at a position corresponding to the minimum permissible oil level, while. the second stationary contact 26c is arranged at a position corresponding to the lowermost oil or no oil level. Thus, when the float 26a comes to the position of the first stationary contact 26b, a so-called 'MIN' signal can be issued from the oil level sensor 26 indicating that the oil in the oil pan 16 is quite small (viz., minimum permissible oil level), and when the float 26a comes to the position of the second stationary contact 26c, a so-called 'no oil' signal can be issued from the same indicating that there is little or no oil in the oil pan 16. Denoted by numeral 28 is a battery, and numeral 30 is a switch incorporated with the ignition switch of the associated engine. That is, the switch 30 closes when the ignition switch is closed for operation of the engine. Denoted by numeral 18 is a microcomputer which receives the information signals from the sensors $S_1$. $S_2$ and $S_3$ and the oil level sensor 26 and the processes the same by using a predetermined program to issue next-mentioned two types of warning signals under certain conditions.

That is, as will be described in detail hereinafter, when the oil level sensor 26 detects that the oil in the oil pan 16 is quite small (viz., minimum permissible oil level), the system issues a so-called 'oil replenishment' warning for letting a driver know the need of oil replenishment. Furthermore, by processing the information signals from the sensors $S_1$, $S_2$ and $S_3$ and the oil level sensor 26, the system judges the time when the oil change is really needed and issues a so-called 'oil change' warning at that time. The program executed by the microcomputer 18 is substantially the same as that of the first embodiment as described hereinafore. Thus, description of the program will be omitted.

Denoted by numeral 32 is a warning device which issues a visual warning when receiving a so-called 'oil replenishment' warning signal from the microcomputer 18, and denoted by numeral 20 is a warning device which issues a visual warning when receiving a so-called 'oil change' signal from the microcomputer 18.

Figure 6A:
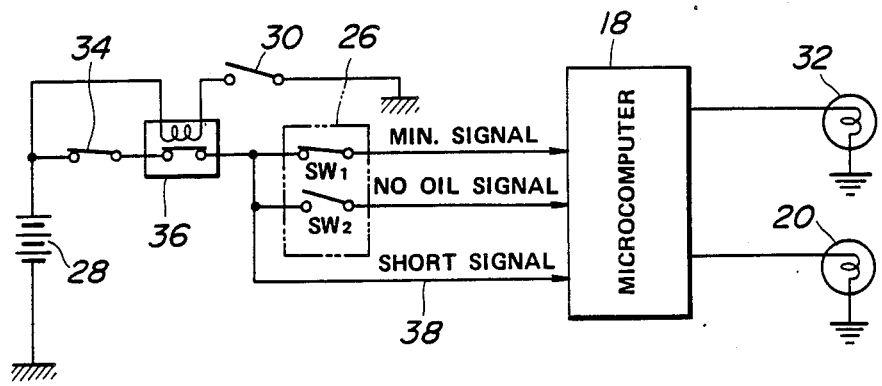
FIGS. 6A and 6B are schematic views of the essential part of the diagram of FIG. 5, showing respectively a condition assumed when oil replenishment is not still made and another condition assumed when oil replenishment is made.
Figure 6B:
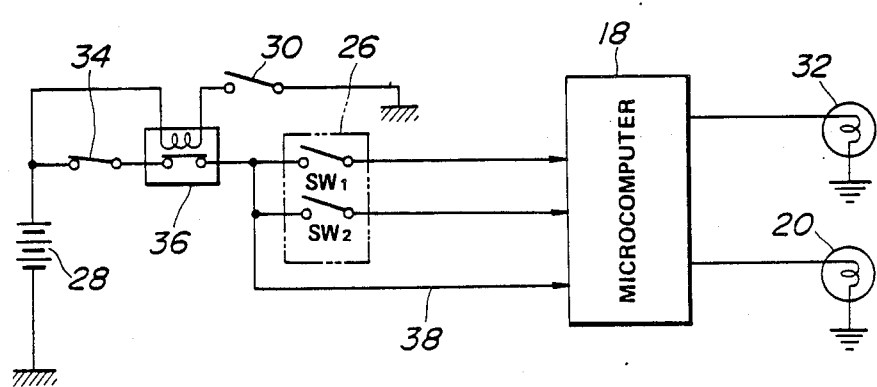

FIGS. 6A and 6B are schematically illustrated circuits of an essential part of the block diagram shown in FIG. 5. In the drawings (viz., FIGS. 6A and 6B). the part consisting of a movable contact on the float 26a and the first stationary contact 26b is indicated by '$SW_1$', and the part consisting of the movable contact and the second stationary contact 26c is indicated by '$SW_2$'.

As shown in the drawings, between the battery 28 and the oil level sensor 26, there are arranged an engine hood switch 34 and a normally closed switch or relay switch 36 which constitute a judging means for judging whether oil replenishment is really necessary or not. The engine hood switch 34 is closed when the engine hood of the associated vehicle is open, and the relay switch 36 opens when the ignition switch 30 closes. A short line 38 extends from the relay switch 36 to the microcomputer 18, bypassing the oil'level sensor 26. As will be understood as the description proceeds, the engine hood switch. 34 prevents malfunction of the warning system which would occur when vehicle is being tracted.

Figure 7:
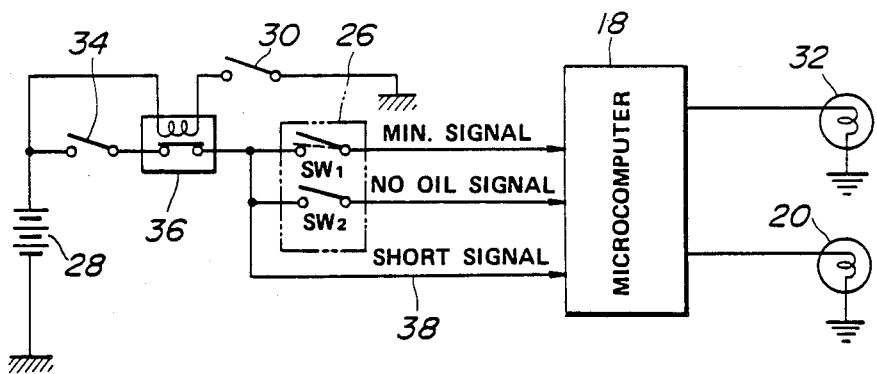
FIG. 7 is a view similar to FIGS. 6A and 6B, but showing a condition of the essential part assumed when the associated motor vehicle is being tracted.

In the following, operation of the warning system of the second embodiment will be described with reference to FIGS. 6 to 8.

First, oil replenishment will be described. When the amount of oil is reduced and comes to the minimum permissible oil level, the switch '$SW_1$' is turned ON. However, when the ignition switch 30 is kept ON, that is, when the associated engine is under operation, the so-called 'MIN' signal of the switch '$SW_1$' is not applied to the microcomputer 18 because the relay switch 36 is open under such condition. When thereafter the ignition switch 30 is turned OFF to stop the engine, the relay switch 36 is closed.

When, for effecting oil replenishment, the engine hood is opened, the engine hood switch 34 is turned ON. Upon this, the warning system assumes such a condition as shown in FIG. 6A. That is, the 'MIN' signal and 'SHORT' signal are now applied to the microcomputer 18. It is to be noted that the 'SHORT' signal is a signal representative of closed condition of the engine hood switch 34 and the relay switch 36. When fresh oil is poured into the oil pan, the oil level is increased and comes to a position to open the switch '$SW_1$'. Thus, upon this, the 'MIN signal disappears. However, the 'SHORT' signal is
       kept applied to the microcomputer 18 as is seen
       from FIG. 6B.

Thus, it will be appreciated that when the 'MIN' signal is cut during application of the 'SHORT' signal, it can be considered that an oil replenishment has been carried out. Upon this, correction of oil change time is executed in the microcomputer 18.

(Since oil change is carried out by removing substantially all of the oil in the oil pan, the switch '$SW_2$' is forced to turn ON once during the oil change work. In this case, the so-called 'NO OIL' signal is applied to the computer 18. Thus, in the computer 18, it is possible to distinguish the oil replenishment from the oil change.)

When, after completion of the oil replenishment, the engine hood is closed, the engine hood switch 34 is turned OFF. Thus, the 'SHORT' signal is cut. The 'SHORT' signal is also cut when the ignition switch 30 is turned ON for starting the engine. Starting and operating the engine may sometimes induce a feigned reduction of the oil in the oil pan inducing a possibility of ON condition of the switch '$SW_1$' and/or the switch '$SW_2$'. However, even under this, OFF condition of the relay switch 36 prevents them from issuing the 'MIN' signal and 'NO OIL' signal.

In the following, state of the warning system under traction of the associated vehicle will be described with reference to FIG. 7. During traction of the vehicle, the oil level in the oil pan tends to move upward and downward. This phenomenon is marked particularly under traction on steep slopes, so that it sometimes occurs that the switch 'SW₁' is turned ON during the traction. However, usually, the engine hood is kept closed (namely, the switch 34 is kept OFF) during the traction of the vehicle, the switch 'SW₁' is prevented from issuing the 'MIN' signal.

Figure 8A:
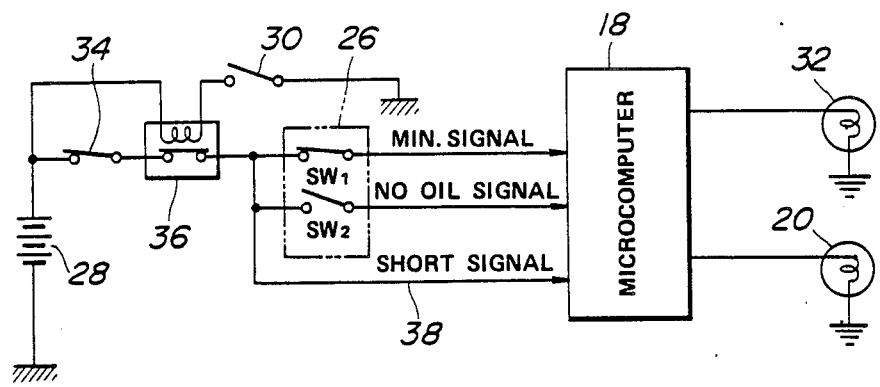
FIGS. 8A and 8B are views similar to FIGS. 6A and 6B, but showing respectively a condition of the essential part assumed when the associated motor vehicle stops on a steep slope and another condition of the same assumed when the vehicle starts on the steep slope.
Figure 8B:
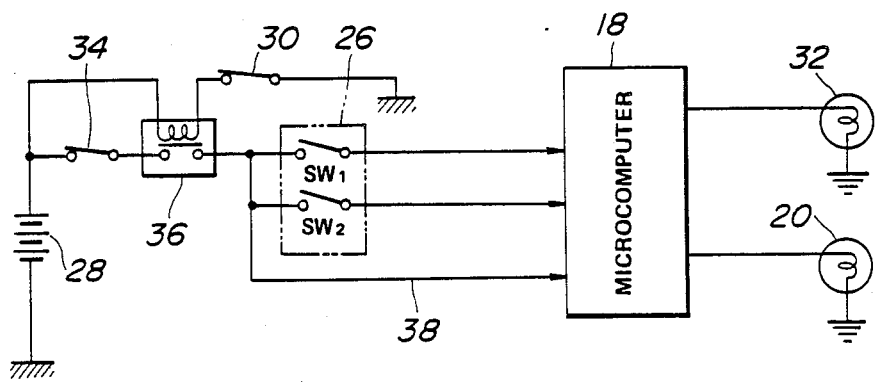

In the following, a state of the warning system taken when the associated vehicle stops on a steep slope will be described with reference to FIGS. 8A and 8B. When, after stop of the engine, the engine hood is opened, the relay switch 36 becomes ON and the engine hood switch 34 becomes also ON. However, even if, under this condition, the switch 'SW₁' is turned ON due to the feigned reduction of oil in the oil pan as is seen from FIG. 8A, the microcomputer 18 does not effect the correction of the oil change time. This is because the state change from ON to OFF of the switch 'SW₁' is impossible unless the oil replenishment or the oil change is practically carried out. However, when, thereafter, the ignition switch 30 is turned ON to start the engine and run the vehicle, the oil level is temporarily increased causing the switch 'SW₁' to temporarily assume its OFF condition, as is shown by FIG. 8B. Thus, under this condition, the state change from ON to OFF is effected by the switch 'SW₁'. However, turning the ignition switch 30 to its ON position for starting the engine causes the relay switch 36 to open cutting the 'SHORT' signal applied to the computer 18. Thus, unlike in the afore-mentioned case, correction of the oil change time is not executed by the computer 18.

In case of oil change, the 'MIN' signal is issued during the time when the 'SHORT' signal is being issued. Thus, the calculation in the computer 18 can be reset by using the 'MIN' signal.

Figure 9:
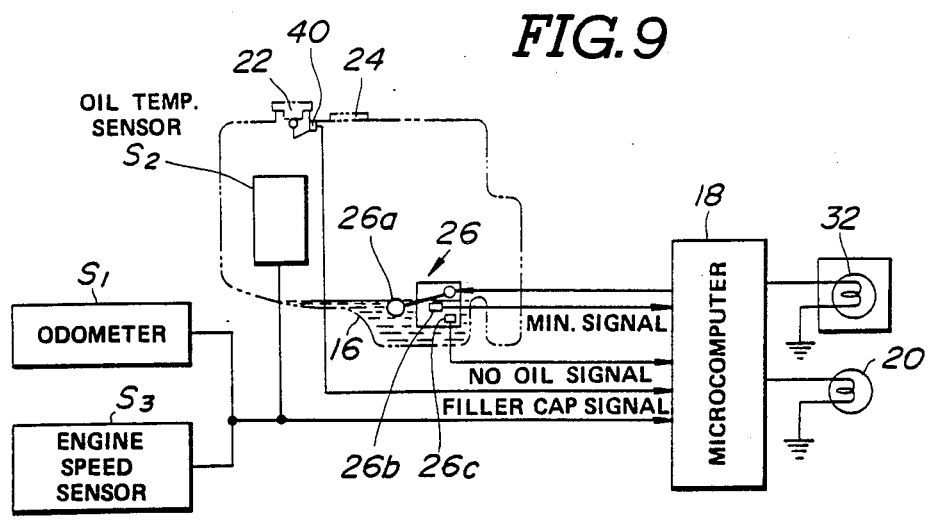
FIG. 9 is a view similar to FIG. 5, but showing a third embodiment of the present invention.

Referring to FIG. 9, there is shown a block diagram of the third embodiment of the present invention. The third embodiment is substantially the same as the second embodiment except that in the third embodiment, a filler cap switch 40 is used as a substitute for the engine hood switch 34 and the relay switch 36.

Figure 10:
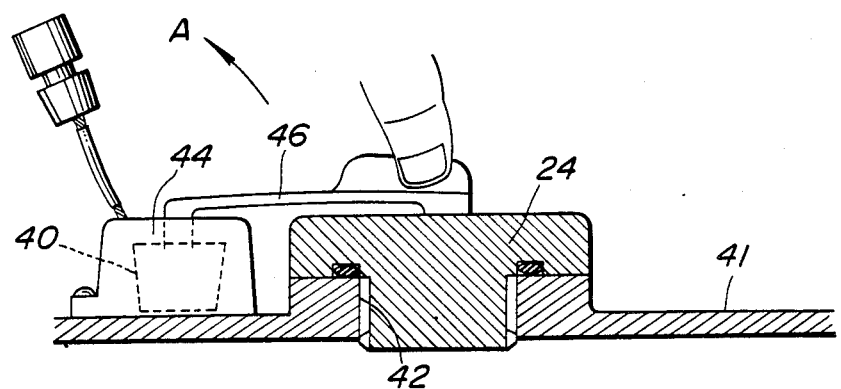
FIG. 10 is a sectional view of a filler cap switch employed in the third embodiment.

The filler cap switch 40 is shown in FIG. 10. In this drawing, numeral 41 denotes a rocker cover of the associated engine. The rocker cover 41 has an oil feeding opening 42 to which the filler cap 24 is removably connected. A switch box 44 is mounted to the rocker cover 41 near the oil feeding opening 42. A lever 46 is pivotally connected to the switch box 44 and extends from the same toward the filler cap 24 and contacts with the same, as shown. The leading end of the lever 46 is somewhat enlarged. The switch box 44 has therein the switch proper 40 incorporated with the lever 46. When the lever 46 assumes the illustrated position, the switch proper 40 assumes its OFF condition, while, when the lever 44 is pivoted upward by the operator's fingers in the direction of the arrow A, the switch proper 40 assumes its ON condition. Thus, it will be appreciated that when, for the purpose of oil replenishment and/or oil change, the filler cap 44 is removed, the switch proper in the switch box 44 is forced to assume its ON condition.

Figure 11:
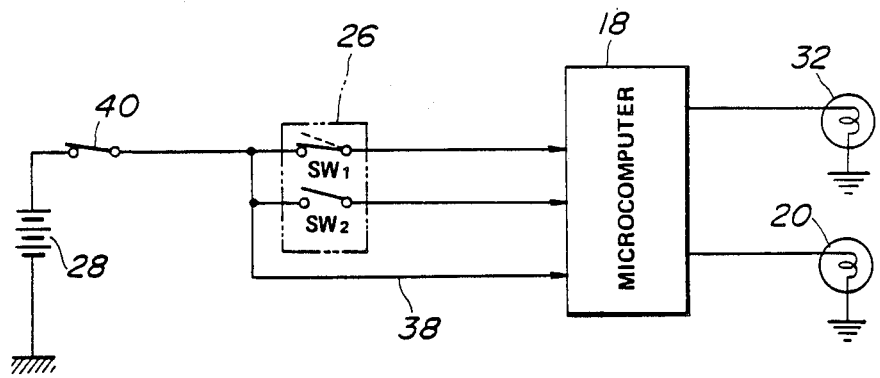
FIG. 11 is a schematic view of the essential part of the block diagram of FIG. 9 of the third embodiment.

FIG. 11 is a schematically illustrated circuit of an essential part of the block diagram of the third embodiment of FIG. 9. Since the filler cap switch 44 assumes its ON condition during the time when the oil replenishment is being carried out, the afore-mentioned state change of the switch 'SW₁' from ON to OFF can be used as an indicator for judging the execution of the oil replenishment.

Since the states of the warning system of the third embodiment which are taken under the oil change, the vehicle traction and the standstill on a steep slope are the same as those in the second embodiment, the description of the states will be omitted. However, in the third embodiment, the circuit of the essential part employed is simple as compared with that of the second embodiment. Furthermore, since energization of the oil level sensor 26 is carried out only when the oil replenishment and/or oil change is carried out, electric consumption is less than the second embodiment.

What is claimed is:

1. An oil degradation warning system for a motor vehicle, comprising:
   first means for detecting respective values of degradation factors of oil, said degradation factors being closely related to the operation history of the motor vehicle;
   second means for adding the detected values by using a predetermined calculation formula and integrating the added values with passage of time;
   third means for issuing a warning signal when the integrated value exceeds a predetermined limit; and
   fourth means which, when oil replenishment is carried out, postpones the issue of the warning signal by a period corresponding to the ratio of the replenished oil to the entire amount of the oil.

2. An oil degradation warning system as claimed in claim 1, in which said fourth means comprises an oil level sensor which detects the oil level in an oil pan of the associated engine.

3. An oil degradation warning system as claimed in claim 2, in which said fourth means further comprises a microcomputer which receives information signals from said oil level sensor and processes the signals in such a manner that if a current value of signal representative of the oil level is equal to or lower than a previously memorized value of signal, it is determined that an oil replenishment has not been carried out.

4. An oil degradation warning system as claimed in claim 3, further comprising a data input terminal by which the natures of used oil are input to the microcomputer as data.

5. An oil degradation warning system as claimed in claim 3, in which said predetermined calculation formula is so formed that the values of degradation factors are multiplied respectively by predetermined weight coefficients of oil degradation.

6. An oil degradation warning system as claimed in claim 5, in which said degradation factors are the moved distance of the vehicle, the temperature of the oil and the engine speed.

7. An oil degradation warning system as claimed in claim 2, in which said oil level sensor is of a float type sensor which includes a float which floats on the oil in the oil pan and a variable resistor which varies the resistance value thereof in accordance with movement of the float.

8. An oil degradation warning system as claimed in claim 2, in which said oil level sensor is constructed to detect both a condition wherein the amount of oil in the oil pan corresponds to the minimum permissible oil level and a condition wherein there is little or no oil in the oil pan.

9. An oil degradation warning system as claimed in claim 8, further comprising a microcomputer which receives information signals from said oil level sensor and issues a warning signal when the oil level sensor detects that the oil in the oil pan is reduced to the minimum permissible oil level.

10. An oil degradation warning system as claimed in claim 9, in which said microcomputer processes the detected values from the first means and the information signal from the oil level sensor, judges the time when the oil change is really needed, and issues a warning signal when the time comes.

11. An oil degradation warning system as claimed in claim 10, further comprising a fifth means connected to said microcomputer for detecting whether oil replenishment is really necessary or not.

12. An oil degradation warning system as claimed in claim 11, in which said fifth means is constructed to disable the oil level sensor from operation when a feigned reduction of oil takes place in the oil pan.

13. An oil degradation warning system as claimed in claim 12, in which said fifth means comprises an engine hood switch which is turned ON when the engine hood is opened, and a relay switch which is opened when an ignition switch of the associated engine is closed, said engine hood switch and said relay switch being connected in series and connected to said oil level sensor.

14. An oil degradation warning system as claimed in claim 12, in which said fifth means comprises a filler cap switch which is constructed to close when the filler cap of the associated engine is removed, said filler cap switch being connected to said oil level sensor.

* * * * *